United States Patent [19]

Mori

[11] 4,453,066
[45] Jun. 5, 1984

[54] METHOD AND APPARATUS FOR THAWING BY HIGH FREQUENCY HEATING

[75] Inventor: Fumiko Mori, Osaka, Japan

[73] Assignee: Matsushita Electric Industrial Co., Ltd., Kadoma, Japan

[21] Appl. No.: 397,698

[22] Filed: Jul. 13, 1982

[30] Foreign Application Priority Data

Jul. 20, 1981 [JP] Japan .............................. 56-113976

[51] Int. Cl.$^3$ ............................................. H05B 6/68
[52] U.S. Cl. ..................... 219/10.55 M; 219/10.55 B; 99/325; 426/243
[58] Field of Search ................. 219/10.55 M, 10.55 B, 219/10.55 R, 10.55 E, 492, 518; 99/325, 327, 451, DIG. 14, 332; 426/243, 241, 524

[56] References Cited

U.S. PATENT DOCUMENTS

| | | | |
|---|---|---|---|
| 3,470,942 | 10/1969 | Fukada et al. | 219/10.55 B X |
| 4,255,639 | 3/1981 | Kawabata et al. | 219/10.55 B |
| 4,370,535 | 1/1983 | Noda | 219/10.55 E X |
| 4,383,157 | 5/1983 | Nakata et al. | 219/10.55 M X |
| 4,390,768 | 6/1983 | Teich et al. | 219/10.55 B |

Primary Examiner—B. A. Reynolds
Assistant Examiner—Philip H. Leung
Attorney, Agent, or Firm—Spencer & Frank

[57] ABSTRACT

A method and an apparatus for thawing a frozen food by high frequency heating. The thawing process is divided into at least four stages of execution. A high frequency wave output is predetermined for each stage, and the execution time of each stage is automatically computed by a function stored in a microcomputer with the weight of the food stuff as a parameter. The use of a plurality of stages provides a faster and satisfactory method of thawing the frozen food stuff.

2 Claims, 9 Drawing Figures

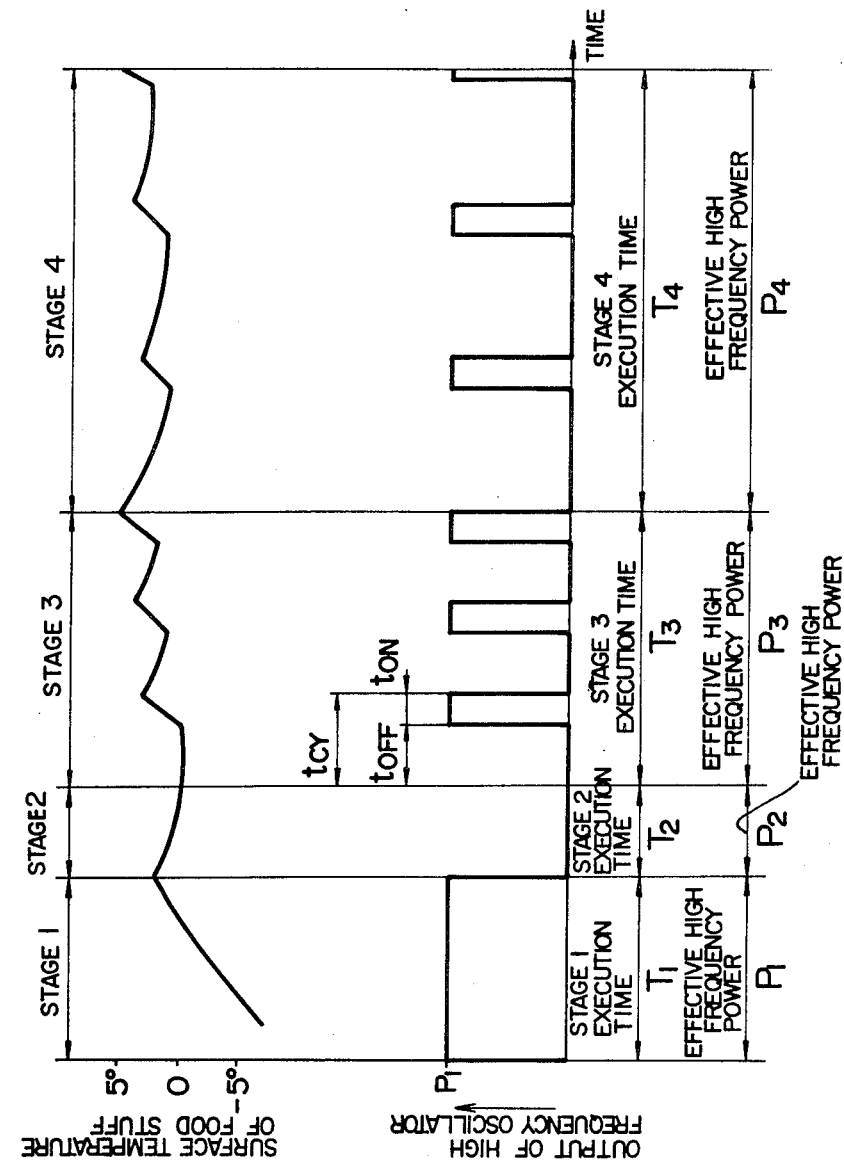
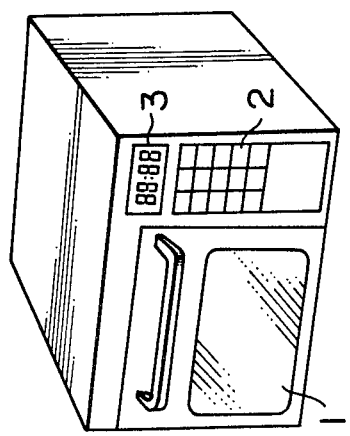

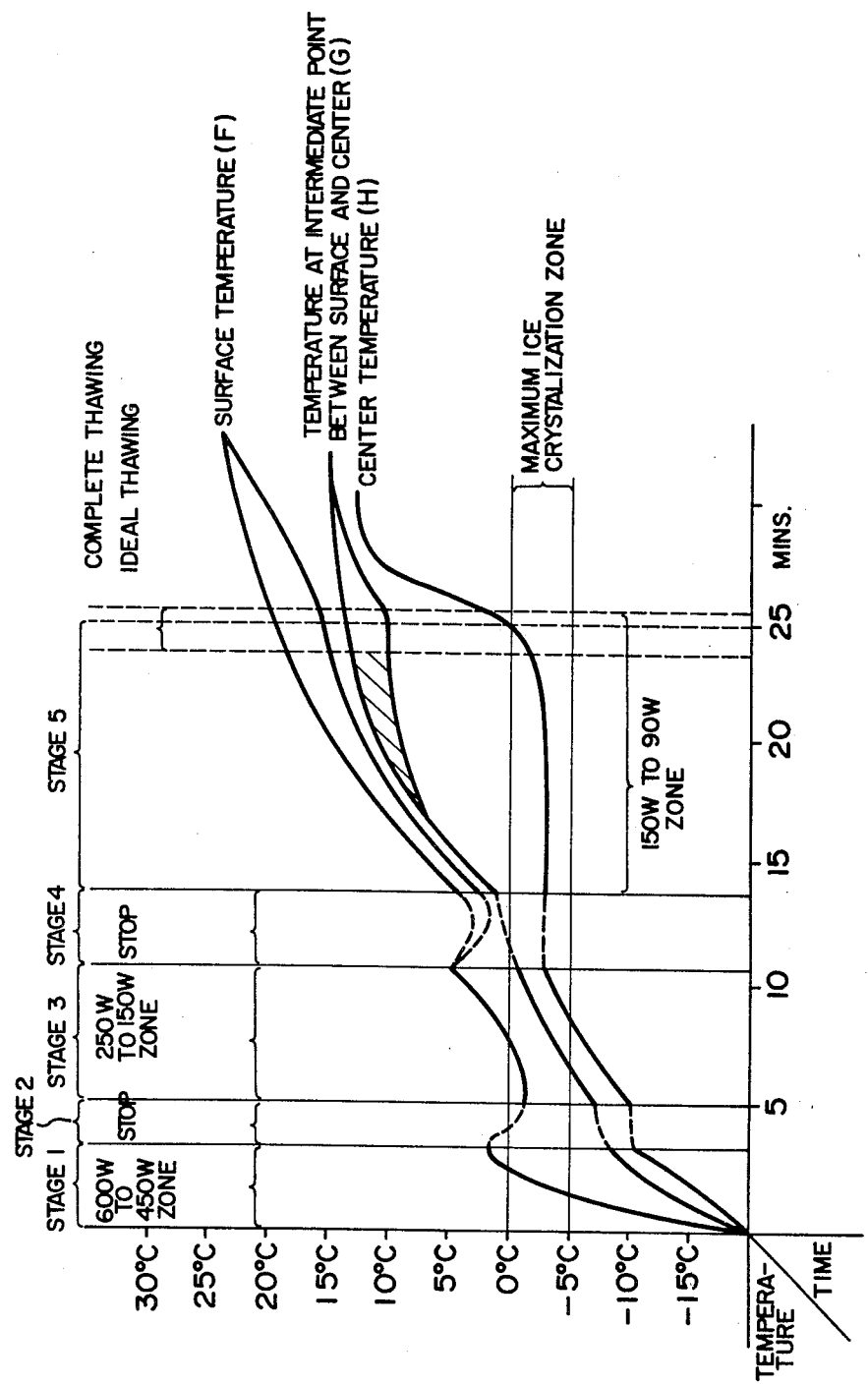

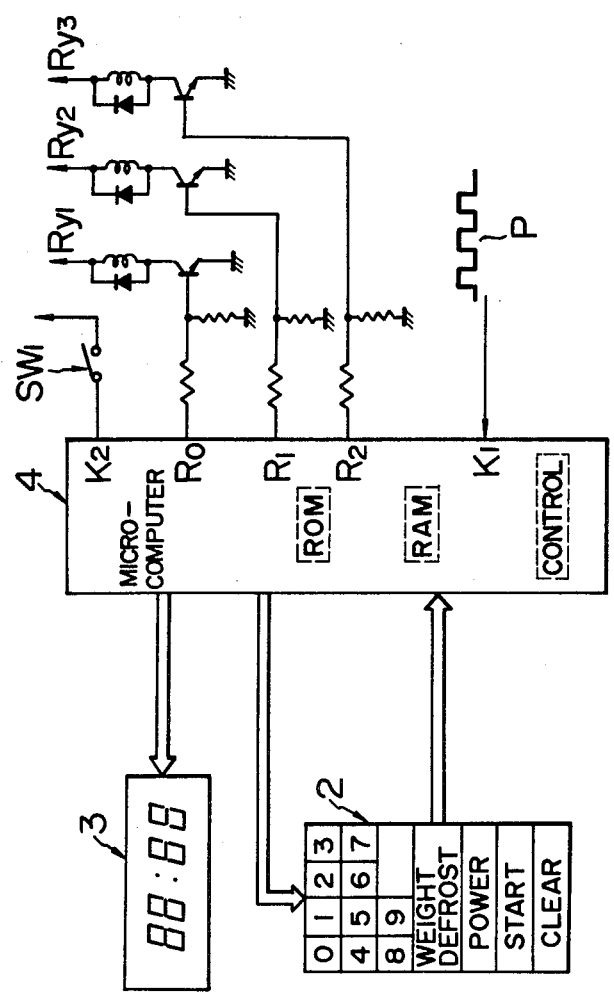

METHOD AND APPARATUS FOR THAWING BY HIGH FREQUENCY HEATING

BACKGROUND OF THE INVENTION

The present invention relates to a method of thawing by high frequency heating, and, in particular, to a method of performing what is called semi-thawing in which the thawing is finished when the ice of the frozen food stuff is substantially melted.

In general, there are two methods of thawing, namely; thawing by external heating using heat conduction and thawing by internal heating using high frequency heating. Thawing by external heating is such that the surroundings of a food stuff is maintained at a higher temperature than the temperature of the food stuff so that heat flows into the frozen food stuff thereby increasing its enthalpy.

In this method, thawing of the frozen food stuff proceeds from the outer periphery of the food stuff toward the center thereof. This thawing by external heating is seen in thawing which utilizes an electric resistance heater, hot water or infrared ray lamp. Thawing by external heating generally requires a long time since most food stuffs are of low heat conductivity. When the outer layer of the food stuff is melted into water, its heat conductivity is decreased below that of the ice, and hence the rate of heat conduction into the internal part of the food stuff is decreased. If the food stuff is thawed in the same temperature zone as was used in freezing from initial to final temperatures, the thawing takes place in substantially twice the time required for freezing. The fact that the thawing takes a long time indicates that a difference in quality has occurred in the solid food even immediately after the thawing process.

In the case of thawing by high frequency electromagnetic waves, on the other hand, the food stuff is caused to generate heat to increase the enthalpy thereof. The thawing progresses from the outer surface and also from the interior of the food stuff since the frozen food stuff itself acts as a heat generating element due to the electromagnetic energy absorbed therein, and hence the food stuff is thawed very fast, resulting in the solid food stuff having a generally stable and uniform quality.

Although thawing by internal heating is superior to thawing by external heating, heating by conventional high frequency heating apparatus often result in unsatisfactory thawing in view of the fact that careful consideration is not given to the distribution of the high frequency waves, the size, shape and weight of the frozen food stuff to be thawed or the difference in the dielectric constants of water and ice.

In conventional high frequency heating apparatus, the frozen food stuff is thawed by (1) simply applying continuous radiation or by (2) repeating predetermined intermittent radiation without considering the weight of the food stuff. Since the dielectric constant of ice is low, the high frequency energy is not easily absorbed into the ice, and therefore in the case of the continuous radiation mentioned in item (1) above, the high frequency radiation first thaws the surface of the food stuff while the interior thereof is left frozen. This lack of uniformity in thawing condition leads to an aqueous solution existing only in the surface of the food stuff after a further certain time elapses.

The aqueous solution has a very high dielectric constant as compared with the frozen object and absorbs the high frequency energy more quickly, with the result that the surface of the food stuff is boiled while the interior thereof remains frozen.

In the case of the intermittent radiation mentioned in item (2) above, overheating of the surface of the food stuff is prevented during interruption of the high frequency radiation, and the heat in the surface is transmitted by conduction into the food stuff, thus allowing time for attaining uniform thawing of the whole food stuff. If the interruption time is too short, however, the disadvantage of the continuous radiation of item (1) is barely reduced and not resolved. If the interruption time of the high frequency wave radiation is too long, on the other hand, an unreasonably long thawing time is required undesirably, resulting in loss of advantages of the high frequency thawing.

Furthermore, since the time required for thawing with high frequency waves is short and the optimum thawing time varies with the quantity of the food stuff involved, it is very difficult to set the heating time to an optimum length.

In view of the above-mentioned disadvantages of the conventional high frequency heating apparatus, the object of the present invention is to solve the above-mentioned problems of the conventional high frequency heating apparatus.

SUMMARY OF THE INVENTION

According to the present invention, a plurality of execution stages are provided, and in each of the stages a predetermined high frequency wave output is used, and the execution time in each stage is computed as a function stored in a micocomputer according to the weight of the food stuff received from a weight input section. In response to a signal for starting the thawing, the predetermined execution stages are executed thereby to realize a faster and satisfactory thawing of the frozen food stuff involved.

BRIEF DESCRIPTION OF THE DRAWINGS

FIG. 1 is a perspective outside view of a high frequency heating apparatus having a thawing program according to an embodiment of the present invention.

FIG. 2 shows output and temperature waveforms of the thawing program.

FIG. 5 is a characteristic diagram showing a temperature change in each of the thawing stages for the frozen food stuff.

FIG. 6 is a block diagram of a central control unit for realizing the thawing program according to an embodiment of the present invention.

DESCRIPTION OF A PREFERRED EMBODIMENT

Figure 3:
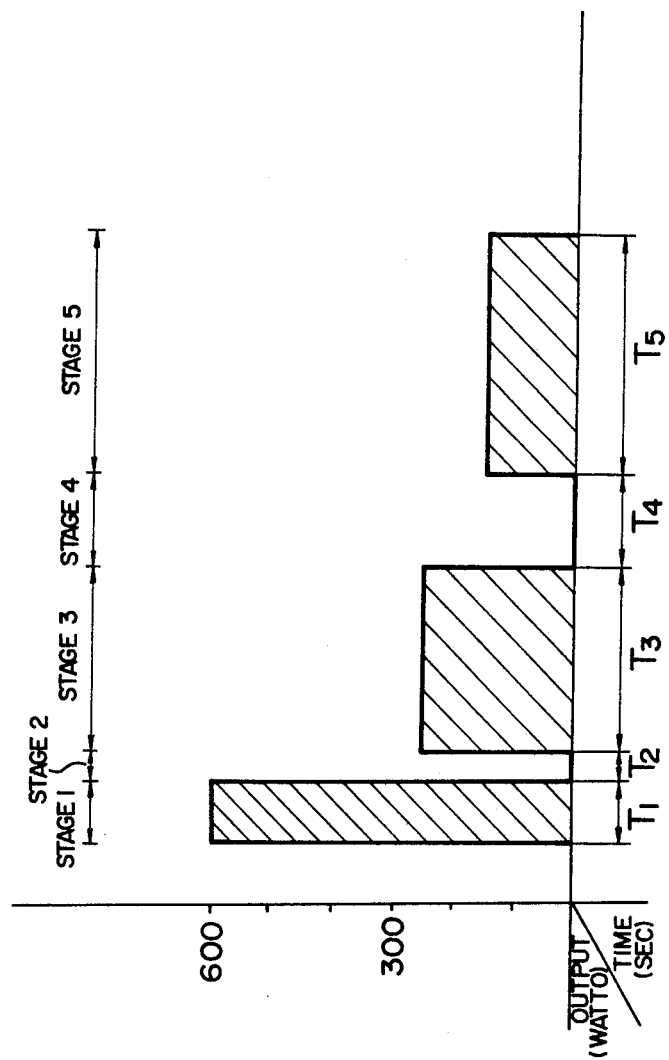
FIG. 3 shows an output waveform of the thawing program according to another embodiment of the present invention.

An embodiment of the present invention will be described below with reference to the accompanying drawings.

In FIG. 1, reference numeral 1 designates a door for closing an opening by way of which a food stuff is placed in a heating chamber. Numeral 2 designates an operating section including an arrangement of operating switches for selecting a thawing operation, start or stop of the operation. Numeral 3 designates a display section for indicating input data numerals or the like. The display section 3 and the operating section 2 may be used to input the weight of the food stuff into a microcomputer (not shown) inside, and therefore they are referred to as a weight input section.

The simplest embodiment of a thawing method according to the present invention will be described with reference to FIG. 2. The upper diagram of FIG. 2 shows the change in surface temperature of the food stuff when the time period for applying the output of a high frequency oscillator is controlled in each stage.

The thawing program in this embodiment includes four stages employing effective high frequency powers $P_1$, $P_2$, $P_3$ and $P_4$ respectively. In the lower diagram, $P_2=0$, while $P_3$ and $P_4$ are obtained by interrupting the normal output $P_1$ of the high frequency oscillator. In stage 3, assume that the oscillation of the oscillator is stopped for a time period $t_{off3}$ and is oscillated with the output $P_1$ for the time period $t_{on3}$ during one cycle $t_{cy3}$. When this control cycle is repeated, the effective high frequency power $P_3$ is given by $$P_3 = \frac{t_{on3}}{t_{cy3}} \times P_1$$

where $t_{cy3} = t_{on3} + t_{off3}$

The important feature of the present invention lies in the fact that execution times $T_1$, $T_2$, $T_3$ and $T_4$ for respective stages are computed in accordance with the weight data of the food stuff received from the weight input section 2, 3.

Specifically, an accumulated high frequency output S of the high frequency heating for the four stages is substantially equal to the calorific value required for thawing ice having a weight corresponding to (0.6 to 0.7)×W, if the average water content in the food stuff of a weight W is 60 to 70%. In other words, the accumulated high frequency output S may be converted to the calorific value S' (kcal), in which S'(kcal)=(0.6 to 0.7)×W×heat of fusion of ice.

This value may be used as a rough estimation of thawing although this value may not be a proper approximation due to the progress of natural thawing during the output stop period, or due to other factors present during stage 2.

On the basis of this concept, the execution time in each stage is determined by the procedure described below.

The execution time $T_1$ corresponds to the time period from the start of heating until the surface temperatures of the food stuff slightly exceeds 0° C., the execution time $T_2$ is the time period required for the surface temperature of the food stuff to be reduced again to or below 0° C., the execution time $T_3$ is the time period required for the surface temperature of the food stuff to reach about 5° C. during which the required heat of fusion (S') is given, and the execution time $T_4$ is a time period determined experimentally for various food stuffs. The resulting values of the time period are stored in the microcomputer as an approximation to a function with the weight W of the food stuff involved as a parameter.

The high frequency power to be used in each stage is also stored in the microcomputer as a predetermined value.

The effective high frequency power $P_1$ is set as the maximum output of the normal oscillator output in order to shorten the total thawing time. $P_2$ which is intended to reduce the increased temperature, is set as the smallest value of all. The values $P_3$ and $P_4$ are experimentally determined not to cause a sharp temperature increase. When $P_3$ is larger than $P_4$, our experiments show that a satisfactory result is obtained.

In this embodiment, in stage 3, the oscillator having the normal output $P_1$ is intermittently oscillated in order to obtain the effective high frequency power $P_3$, and it is advantageous in that a simplified construction of the high frequency oscillator and improved heat conduction due to fluctuations of the food temperature can be attained. If a given stage, say stage 3, is started with the stoppage of the oscillator, the time period of stage 2 is substantially lengthened to $(T_2+t_{off})$ resulting in satisfactory thawing. If these advantages are disregarded, the value $P_3$ or $P_4$ which is not determined by interruptions of $P_1$ may be used.

Now, a second embodiment of the present invention will be described with reference to FIG. 3.

The thawing program in this embodiment is executed in accordance with a sequence of five stages. The user inputs the weight of a food stuff to be thawed in the weight input section, so that the microcomputer computes execution times $T_1$, $T_2$, $T_3$, $T_4$ and $T_5$ of the respective stages according to a computation formula stored in advance as described later. The user, after inputting the food stuff weight as mentioned above, inputs a thawing start signal thereby realizing a faster and more satisfactory thawing of the food stuff.

In the embodiment of FIG. 3, assume that the weight of the frozen food stuff is W grams, the standard radiation time at the stage 1 is $t_1$ seconds, the radiation factor per unit weight of the frozen food stuff is $K_1$, the radiation factor at the stage 3 is $K_3$, and the radiation factor at the stage 5 is $K_5$. Under these conditions, the execution time $T_n$ for a stage n is given in seconds by the formula for respective stages $T_n = t_n + K_n W$, where $t_n$ and $K_n$ are constants. Then, each stage of this embodiment is executed as follows:

Stage 1

In this stage, the standard radiation time t is set to 10 seconds and the radiation factor $K_1$ in seconds per unit weight of the frozen food stuff is set from experimental data to 0.2. With a high frequency output of 450 to 600 watts, the food stuff is radiated for the time $T_1$ seconds indicated below.

$T_1 = 10$ seconds $+ 0.2 \times W$

Stage 2

The high frequency radiation is suspended for one half of the radiation time length $T_1$ of the stage 1. The suspension time $T_2$ is thus given as $T_2 = \frac{1}{2} T_1$ or $$T_2 = 10/2 + (0.2/2) \times W$$

Stage 3

In this stage, the radiation factor $K_3$ is set to 0.3 and the high frequency output is reduced to 150 to 250 watts. The food stuff is radiated for a time of $T_3$ seconds given by the following formula:

$$T_3 = 60 \text{ seconds} + 0.3 \times W$$

Stage 4

The high frequency radiation is suspended for one half of the radiation time length $T_3$ of the stage 3. The suspension time $T_4$ is thus given as $$T_4 = \tfrac{1}{2} T_3$$

or $$T_4 = 60/2 + 0.3/2 \times W$$

Stage 5

In this stage, a value of 0.6 is selected as the radiation factor $K_5$ and the high frequency output is further reduced to 90 to 150 watts. The food stuff is radiated for a radiation time length of $T_5$ shown by $$T_5 = 60 \text{ seconds} + 0.6 \times W$$

The thawing is finished through the above-mentioned five stages.

The factors incorporated in the formulae of the five stages are experimentally obtained from business or domestic high frequency heating apparatus now widely used and are applicable to ready-frozen and home-frozen food stuff.

The food stuff thawing operation in each stage will be explained with reference to FIGS. 4 and 5.

Stage 1

Figure 4A:
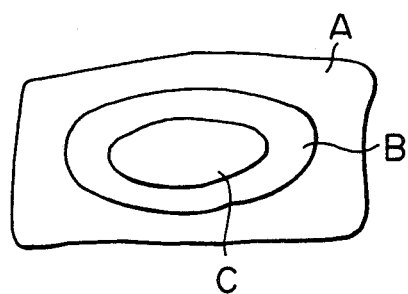
FIGS. 4a and 4b are sectional views showing the heat conduction for thawing the frozen food stuff.

The initial temperature of a frozen food stuff is uniform and low at the surface A zone, inner B zone and C zone shown in FIG. 4a since the whole food stuff is in a completely frozen condition. The thawing of the A zone is accelerated by a high frequency wave having a large output of from 450 to 650 watts. Unless the radiation time is determined in accordance with the weight of the frozen food stuff involved, however, the frozen food stuff, if small in weight, will be overheated at the A zone. If the radiation time is limited to the time length obtained by multiplying the weight of the food stuff in grams by the factor of 0.2 second, on the other hand, the food stuff is radiated effectively without being overheated.

FIG. 5 shows an example of a frozen food stuff of 1000 grams at $-20°$ C. Thus a surface temperature curve F of this frozen food stuff reaches a maximum of about $2°$ C., a temperature curve G representing the temperature at an intermediate point between the surface and the center reaches about $-8°$ C. and a temperature curve H of the central part reaches about $-10°$ C.

Stage 2

Figure 4B:
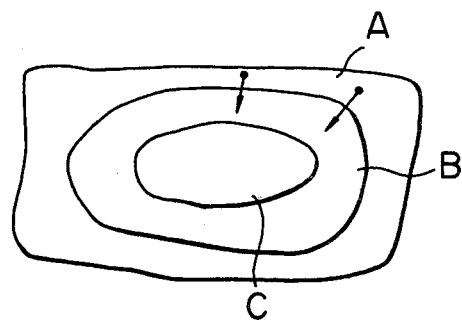

Radiation of the frozen food stuff with high frequency waves is suspended for one half of the radiation time of stage 1. When the high frequency radiation is stopped in this way, the heat of the A zone is transmitted to the B and C zones by heat conduction as shown in FIG. 4b, so that the temperature of the A zone is reduced while the temperature of the B and C zones increase. The temperatures of the respective parts thus begin to be averaged out as shown in FIG. 5.

Stage 3

By the time of completion of stage 2, the temperature of the whole frozen food stuff increases considerably, and therefore the radiation of a high output high frequency wave causes the temperature of the food stuff to be averaged out at a higher level than in stage 2, with the result that the thawing process further progresses with the dielectric constant of the food stuff considerably increased.

Stage 4

The high frequency wave radiation is suspended for one half of the radiation time of stage 3. By a phenomenon similar to that of stage 2, the temperature of the whole food stuff is averaged out again at a higher level than in stage 2, with the result that the food stuff is thawed further with a considerable increase in the dielectric constant thereof.

Stage 5

In stage 5, the food stuff, which is even higher in temperature and dielectric constant for the same reason as in stage 3, is prevented from being overheated by radiation of a low-output high frequency wave of 90 to 150 watts for a time length corresponding to the sum of 60 seconds and the product of 0.6 second and the food stuff weight W in grams. The whole food stuff is thawed without being partially heated as shown in FIG. 5. Under this condition, the surface temperature curve F reaches about $25°$ C., which is a low final temperature.

A specific electronic circuit for realizing the embodiment of the invention shown in FIG. 2 will be described with reference to FIGS. 6 and 7.

Figure 7:
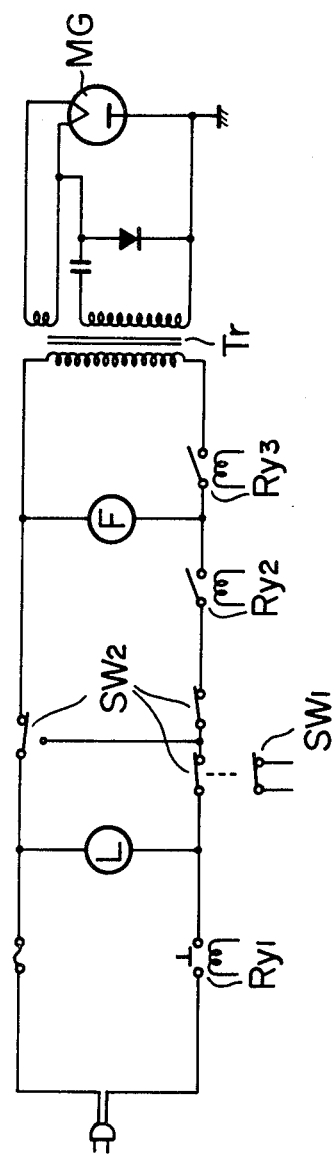
FIG. 7 is a circuit diagram for a high frequency heating apparatus embodying the present invention.

FIG. 6 is a block diagram showing a central control section for controlling relays shown in FIG. 7. In FIG. 6, numeral 4 designates a microcomputer including a storage section (ROM) for storing a program and predetermined constants required for the present invention, another storage section (RAM) for storing temporary values, and a control section for controlling all of them.

By operating the operating section 2, the user sets the weight of the food stuff, starts heating, or stops heating. Reference character SW1 designates a door switch shown in FIG. 7 for monitoring the open or closed state of the door 1 of the heating chamber. Characters $R_0$, $R_1$ and $R_2$ designate outputs for driving the relays Ry1, Ry2 and Ry3 respectively. Character K1 designates a counter in the microcomputer 4 for measuring a predetermined length of time by counting pulses P of a predetermined period.

A circuit of the high frequency heating apparatus is shown in FIG. 7. In FIG. 7, characters Ry1, Ry2 and Ry3 designate relays controlled by the central control section. When the relay Ry1 is closed, an oven lamp L is lit thereby illuminating the inside of the heating chamber. When the door 1 of the heating chamber is closed, the door switches SW1 and SW2 are both closed as shown. When the relay Ry2 is closed, a fan F for cooling a high frequency oscillator (magnetron) MG is started. Upon the closing of the relay Ry3, on the other hand, a voltage is applied to a high voltage transformer Tr, so that the high frequency wave is generated by oscillation of the magnetron MG.

In other words, when the relays Ry1 and Ry2 are closed followed by closing of the relay Ry3, the high frequency wave is generated, while upon the opening of the relay Ry3, the high frequency wave is stopped.

Figure 8:
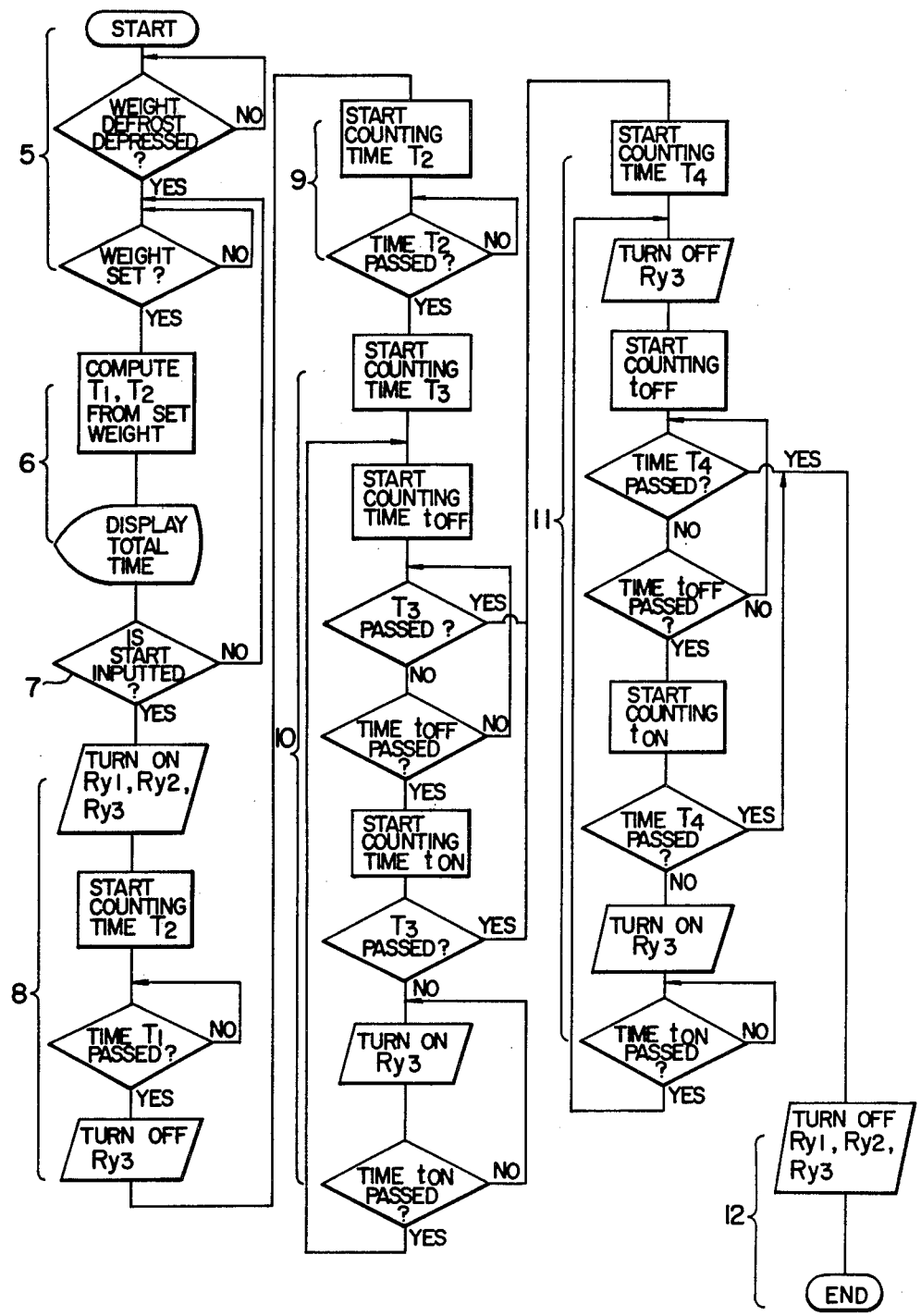
FIG. 8 is a flowchart for realizing a thawing program according to an embodiment of the present invention.

The flowchart of FIG. 8 shows a part of the program stored in the microcomputer 4 representing essential parts for executing the thawing sequence of the four stages shown in FIG. 2. In this diagram, numeral 5 designates steps for receiving the weight and other factors required for execution of the thawing sequence from the operating section. Numeral 6 designates steps for computing the times $T_1$, $T_2$, $T_3$ and $T_4$ and the total time by use of the weight set and the constants stored in the storage section (ROM).

When the start switch is depressed at a step 7, the process checks to see whether the door 1 of the heating chamber is closed, followed by a step 8 in which the relays Ry1, Ry2 and Ry3 are turned on thereby starting and continuing heating for the time $T_1$. A step 9, which belongs to the stage 2, keeps the relay Ry3 off until the lapse of time $T_2$ to stop the oscillation.

A step 10 belongs to the stage 3 where the relay Ry3 is repeatedly turned on and off for the time lengths $t_{off}$ and $t_{on}$ stored in the storage section (ROM) thereby producing the effective high frequency power $P_3$. A step 11 belongs to the stage 4 where the relay Ry3 is turned on and off repeatedly on the basis of the times $t_{off}$ and $t_{on}$ stored in the storage section (ROM) thereby producing the effective high frequency power $P_4$. A step 12 completes all the stages thereby turning off the relays Ry1, Ry2 and Ry3.

In this way, the present invention is easily realized by the use of a microcomputer.

In the embodiment of the present invention, the weight input section takes the form of an operating switch and a display section, to which the present invention is not limited. Instead, it may be combined with a weight measuring mechanism such as a scale.

It will be understood from the foregoing description that according to the present invention, the frozen food stuff is thawed by a combination of the three output levels and the output suspension of high frequency heating, thereby leading to the following advantages:

1. The whole thawing time is short, the final temperature at the final thawing stage is not too high, and the maximum ice crystalization zone ($-5°$ C. to $0°$ C.) is passed quickly, thus making it possible to thaw the food stuff satisfactorily without drying or overheating the surface thereof.

2. The food stuff is thawed by high frequency heating, so that the thawing is finished within a short time as compared with thawing by external heating.

3. Since thawing is carried out within a short time and with internal heating by high frequency radiation, the food stuff is thawed with the quality of the food stuff being maintained and not degraded.

4. The user inputs the weight of the food stuff, and the required execution time is automatically computed, followed by automatic thawing. Thus, defrosting is very convenient for the user.

I claim:

1. A method of thawing a frozen food stuff in a high frequency heating apparatus having a high frequency oscillator, input means and a microcomputer to control said high frequency oscillator, said method comprising the steps of:

inputting the weight W of said frozen food stuff into said input means;

subjecting said frozen food stuff to high frequency radiation for a first time period $T_1$ in a first stage, said high frequency oscillator oscillating continuously during said first time period $T_1$;

stopping generation of said high frequency radiation for a second time period $T_2$ in a second stage by terminating oscillation of said high frequency oscillator; and subjecting said frozen food stuff intermittently to said high frequency radiation for a third time period $T_3$ in a third stage, said high frequency oscillator repeating during said third time period $T_3$ an operation cycle $t_{cy3}$ consisting of a constant on-period $t_{on3}$ during which said high frequency oscillator generates high frequency radiation and a constant off period $T_{off3}$ during which said oscillator does not generate radiation, whereby said first, second and third time periods $T_1$, $T_2$ and $T_3$ are calculated from the equation $$T_n = t_n + K_n W,$$

where $T_n$ is the time period of each of n thawing stages, $t_n$ is a constant equal to the standard radiation time for each of said n stages, and $K_n$ is a constant having the dimensions of time per unit weight W of said frozen food stuff, said constants $t_n$ and $K_n$ being stored in said microcomputer.

2. A high frequency heating apparatus comprising:

a heating chamber for thawing a frozen food stuff placed therein;

a high frequency oscillator for supplying said heating chamber with high frequency radiation;

a weight input section for inputting the weight W of said frozen food stuff;

a high frequency oscillator control means for starting and stopping oscillation of said high frequency oscillator; and a central control section for controlling thawing of said frozen food stuff, said central control section including calculating means for calculating first, second and third time periods $T_1$, $T_2$ and $T_3$ which respectively define first, second and third thawing stages, said time periods being calculated from the equation $$T_n = t_n + K_n W,$$

where $T_n$ is the time period for each of n thawing stages, $t_n$ is a constant equal to the standard radiation time for each of said n stages, and $K_n$ is a constant having the dimensions of time per unit weight W of said frozen food stuff, said constants $t_n$ and $K_n$ being stored in said microcomputer;

memory means for storing said constants $T_n$, $K_n$ and an operation cycle $t_{cy3}$ having a predetermined constant on-period $t_{on3}$ and a constant predetermined off-period $t_{off3}$ in said third time period $T_3$;

time counting means for counting said first, second and third time periods $T_1$, $T_2$ and $T_3$ sequentially, and counting said off-period $t_{off3}$ and on-period $t_{on3}$ in said third time period $T_3$ repeatedly; and control means for applying to said high frequency oscillator control means a control signal in response to the start and stop of each of said periods counted by said time counting means so that said high frequency oscillator oscillates continuously during said first time period $T_1$, stops oscillating during said second time period $T_2$, and oscillates intermittently in accordance with said off-period $t_{off3}$ and on-period $t_{on3}$ during said third time period $T_3$.

* * * * *